UNITED STATES PATENT OFFICE.

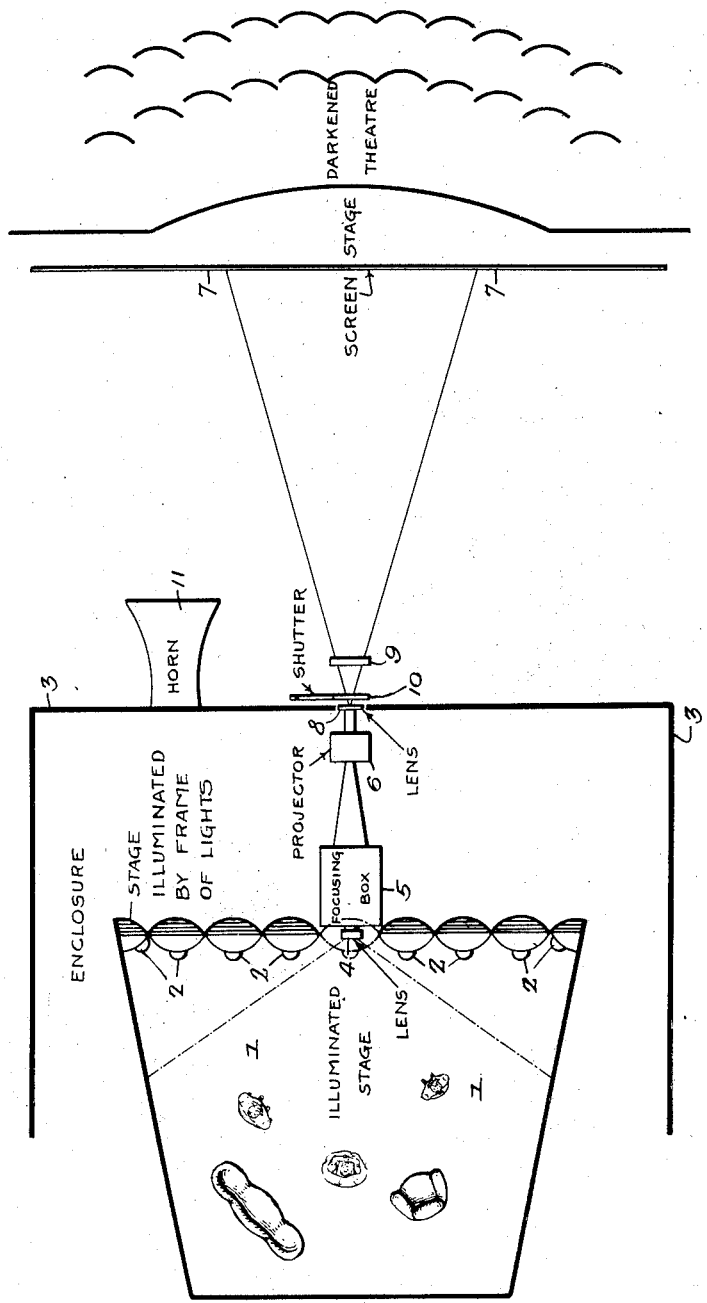

FERDINAND J. OEBBECKE, OF PHILADELPHIA, PENNSYLVANIA.

STAGE ILLUSION EFFECT.

1,339,279.  Specification of Letters Patent.  Patented May 4, 1920.

Application filed August 11, 1919. Serial No. 316,685.

*To all whom it may concern:*

Be it known that I, FERDINAND J. OEBBECKE, a citizen of the United States, residing in Philadlephia, Pennsylvania, have invented certain Improvements in Stage Illusion Effects, of which the following is a specification.

The object of my invention is to provide a stage illusion effect and to throw upon a screen, such as those employed for the display of moving pictures, the actions of a person or persons on a stage in the act of interpreting a play, or part of a play, and reading the lines thereof, and further, to provide means whereby such lines may be heard by the audience simultaneously with the reading thereof.

The structure comprises a suitable casing or inclosure for a stage where the action occurs, with suitable illuminating means, a condensing lens, projector, and shutter, and a megaphone or similar device whereby the voices of the actors or performers can be heard; and a screen or curtain which receives the image of the actors on the stage, very much after the order of displaying such image upon the ground glass of a camera, excepting that the image of the action and the performers as displayed upon the viewing screen or curtain in accordance with my invention will be in the proper order.

These and other features of my invention are more fully described hereinafter, reference being had to the accompanying drawing showing a diagrammatic view illustrating the manner of carrying out the display of scenic acts or stage productions in accordance with my invention.

The idea of producing an illusion such as described is for the purpose of introducing the simulation of a moving picture into an act being portrayed on a stage by a group of actors. By the use of mechanism interposed between the point where the actors are stationed and the viewing screen or curtain, a complete picture of the same may be thrown upon said viewing screen or curtain, and by employing the usual rotating shutter common to moving picture projecting machines, the complete illusion of a moving picture will be produced.

In the drawings, 1 represents the stage setting of a room or other scene in which the actors are appearing; which setting is preferably illuminated, as by means of a complete frame of lights 2, which may be set all around the front of the stage setting 1 so that, preferably, no shadows will be cast. A front screen or partial inclosure 3 is employed for cutting off all view of the stage setting 1 and the actors from the front, except that collected by a lens properly set or focused with respect to said stage setting and the actors thereon.

At a suitable point, preferably centrally of the front wall of such inclosure 3, a collecting lens 4 is placed which, in this arrangement, communicates with a box or casing 5 of the camera type having the usual ground glass plate, and the picture so received upon the ground glass plate of the same is transmitted from this box and thrown by a projecting device 6 onto a viewing screen 7 in the same or substantially the same size as the original stage setting, or in any reduction or enlargement of the same, as may be desired. Interposed between the projecting lens 8 and a lens 9, the arrangement of which constitutes means for showing the elements of the scene in the proper relative positions, I provide a rotating shutter 10 of the type common to ordinary motion picture projecting machines, or any similar device capable of performing a similar function in order that the scene displayed upon the screen 7 may simulate moving picture representation.

In order that the words spoken by the actors may be heard by the audience, located in the darkened theater, the inclosure 3 will be provided in its front wall with a horn or megaphone 11.

The several parts of the projecting apparatus, as well as the inclosure 3, will be concealed from the audience by the viewing screen or curtain 7, and the latter may be provided with a framed viewing space to give a sharp, well defined outline to the scene shown thereon, or any other means may be employed to frame the picture or pictures displayed.

I claim:

1. The method of producing stage effects which comprises collecting on a ground glass screen a scene displayed upon an inclosed and illuminated stage whereon the living actors may assemble for the portrayal of an act or scene of a play; projecting the scene from the ground glass screen to a translucent screen; and momentarily cutting off the scene so projected at substantially regular intervals to produce upon the translucent screen the illusion of a moving picture.

2. Means for producing stage illusion effects, comprising an illuminated stage upon which living actors may assemble for the portrayal of an act or scene of a play, means for collecting upon a ground glass screen the scene so displayed, a viewing screen, and a projecting device for receiving said scene from the ground glass screen and displaying it upon the viewing screen.

3. Means for producing stage illusion effects, comprising an illuminated stage upon which living actors may assemble for the portrayal of an act or scene of a play, means for collecting upon a ground glass screen the scene so displayed, a viewing screen, a projecting device for receiving said scene from the ground glass screen and displaying it upon the viewing screen, and a rotating shutter for momentarily cutting off the scene so projected at substantially regular intervals whereby the illusion of a moving picture may be produced upon said viewing screen.

4. Means for producing stage illusion effects, comprising an illuminated stage upon which living actors may assemble for the portrayal of an act or scene of a play, a camera for collecting upon a ground glass screen the scene so displayed, a projecting device, a viewing screen upon which said scene is projected, and provision for collecting and delivering the sound of the words spoken by the actors.

5. Means for producing stage illusion effects, comprising an illuminated stage upon which living actors may assemble for the portrayal of an act or scene of a play, a camera for collecting upon a ground glass screen the scene so displayed, a projecting device, a viewing screen upon which said scene is projected, a rotating shutter for momentarily cutting off the scene so projected at substantially regular intervals whereby the illusion of a moving picture may be produced upon said viewing screen, and provision for collecting and delivering the sound of the words spoken by the actors.

6. Means for producing stage illusion effects, comprising an illuminated stage upon which living actors may assemble for the portrayal of an act or scene of a play, means for collecting upon a ground glass screen the scene so displayed, a viewing screen for receiving said scene, means for projecting the scene from the ground glass screen to the viewing screen, an inclosure for that part of the stage upon which the acting is taking place whereby the view of the same is cut off at all points except at the receiving lens, and a horn or megaphone for the passage of sound of the lines of the play read by the actors.

7. Means for producing stage illusion effects, comprising an illuminated stage upon which living actors may assemble for the portrayal of an act or scene of a play, means for collecting upon a ground glass screen the scene so displayed, a viewing screen for receiving said scene, means for projecting the scene from the ground glass screen to the viewing screen, a rotating shutter interposed between the projecting means and the viewing screen for momentarily cutting off the scene so projected at substantially regular intervals whereby the illusion of a moving picture may be produced upon said viewing screen, an inclosure for that part of the stage upon which the acting is taking place whereby the view of the same is cut off at all points except at the receiving lens, and a horn or megaphone for the passage of sound of the lines of the play read by the actors.

FERDINAND J. OEBBECKE.